United States Patent [19]

Lindgren

[11] 4,222,549
[45] Sep. 16, 1980

[54] APPARATUS FOR BREAKING WOOD

[75] Inventor: Mats Lindgren, Vikmanshyttan, Sweden

[73] Assignee: Nordfor AB, Säter, Sweden

[21] Appl. No.: 922,278

[22] Filed: Jul. 6, 1978

Related U.S. Application Data

[63] Continuation-in-part of Ser. No. 720,604, Sep. 7, 1976, Pat. No. 4,172,479.

[30] Foreign Application Priority Data

Apr. 14, 1976 [SE] Sweden .............................. 7604423

[51] Int. Cl.³ ...................... B66F 33/24; F02M 57/06
[52] U.S. Cl. ............................. 254/93 HP; 60/597;
144/34 B; 144/193 R; 180/89.2; 313/120;
254/124; 417/380
[58] Field of Search .......... 144/34 B, 309 AC, 193 R;
60/597; 417/380; 313/120; 180/64 A; 254/104,
93 HP, 124

[56] References Cited

U.S. PATENT DOCUMENTS

| | | | |
|---|---|---|---|
| 2,140,325 | 12/1938 | Morse | 254/93 HP |
| 2,495,092 | 1/1950 | Cox et al. | 180/64 A |
| 2,657,904 | 11/1953 | Evenson | 254/104 |
| 3,822,861 | 7/1974 | Scott | 254/104 |

FOREIGN PATENT DOCUMENTS 2446432 5/1975 Fed. Rep. of Germany.

Primary Examiner—W. Donald Bray
Attorney, Agent, or Firm—Frishauf, Holtz, Goodman & Woodward

[57] ABSTRACT

A method and apparatus for use in breaking wood, such as wood splitting and tree felling, for causing the wood to break under the influence of a force acting on the cutting surfaces of a notch in the wood, such as a saw notch. The wood breaking force is produced by means of an inflatable cushion which is inserted in a flattened state into the saw notch and connected to the combustion chamber of the cylinder of the power saw motor to be inflated with compressed gas from the combustion chamber. Also disclosed is a special spark plug for the power saw motor for use in supplying the compressed gas from a combustion chamber to the inflatable cushion.

11 Claims, 8 Drawing Figures

APPARATUS FOR BREAKING WOOD

This is a Continuation-In-Part of U.S. application Ser. No. 720,604, filed Sept. 7, 1976 and now U.S. Pat. No. 4,172,479.

This invention relates to apparatus for use in the felling of trees and in the splitting of wood. More particularly, in connection with felling of trees the invention relates to apparatus for obtaining a necessary tipping force after the intended sawing or corresponding operations have been carried out.

At logging operations so-called felling wedges increasingly are used in connection with tree felling. These wedges are forced into the new notch in order to effect a desired tipping force. Known felling wedges are intended either to be driven in manually by means of mechanical members or they are driven in hydraulically. Usually the hydraulic force is produced by a manual pumping operation. Wedges of this last mentioned type work satisfactorily, but are relatively heavy to carry. Moreover, they require a bulky and heavy additional equipment, which the operator must carry together with the power saw.

Wood splitting for obtaining fireplaces is generally carried out using an axe and/or wedges which are driven into notches to split the wood in the direction of the grain of the wood. These operations are difficult to perform.

These problems are solved according to the invention by utilizing a very simple, light-weight device, which requires only little space and can replace conventional tree felling and wood splitting wedges. A highly advantageous property of said device is that it renders possible the utilization of the engine of a power saw as a drive source.

SUMMARY OF THE INVENTION

According to a first aspect of the invention, in wood breaking operations such as wood splitting or tree felling, the necessary breaking force is obtained by utilizing a cushion, which is expandible by inflation and connected to a pressure fluid source and preferably acts directly on one of the surfaces of the wood to be broken, such as a tree trunk. To attain this object, the cushion is inserted in a flattened state into a saw cut or corresponding notch and thereafter connected to said pressure fluid source. Alternatively, however, the cushion can be caused to act on said cutting surface via lever means.

In order to reduce the additional equipment to be taken along by the operator, it is preferred to utilize as said pressure fluid source the combustion chamber of the cylinder of the engine of the power saw used for making the cutting surfaces in, for example, a tree trunk. Preferably, the cushion is connection to the cylinder via a check valve.

According to a second aspect of the invention, apparatus for producing wood breaking forces for splittting wood or for felling of trees, comprises a cushion expandible by inflation which is provided with conduit means for connection to a pressure fluid source and which is capable upon inflation to apply a necessary breaking force to at least one cutting surface made in the wood, such as a tree trunk, by sawing or corresponding operation. In order to bring about a direct action on the cutting surface, the cushion preferably is designed so as to be insertible in a flattened state into a notch in the wood. Alternatively, however, the necessary tipping moment produced by the cushion can be applied to said cutting surface by means of lever means connected to the cushion.

According to a preferred embodiment, the cushion is adapted for connection to the combustion chamber of the cylinder of the engine of the power saw used for making the cutting surfaces in the wood. In one embodiment, the cushion is connected to the cylinder via a check valve provided in a passage extending from the cylinder and downstream of a cut-off valve. In a further embodiment, connection to the cylinder is via a special spark plug having passageway formed therein. No equipment, therefore, is required for inflating the cushion beyond such normally taken along by the operator, viz. the power saw.

The invention in its simplest form, thus, requires the operator in addition to the ordinary power saw to carry only a cushion, which is very light and in a flattened state requires little space, and a conduit to connect the cushion to the power saw. The cylinder of the engine already at its manufacture may be provided with a valve mechanism for connection of the conduit for use in inflating and deflating the cushion, respectively. Alternatively a specially designed spark plug may be used. Due to the fact that only a conduit connection is required between the cushion and the power saw, the invention further permits the operator to stay at safe distance from the tree while it is being tipped.

DETAILED DESCRIPTION

Figures 1, 2:
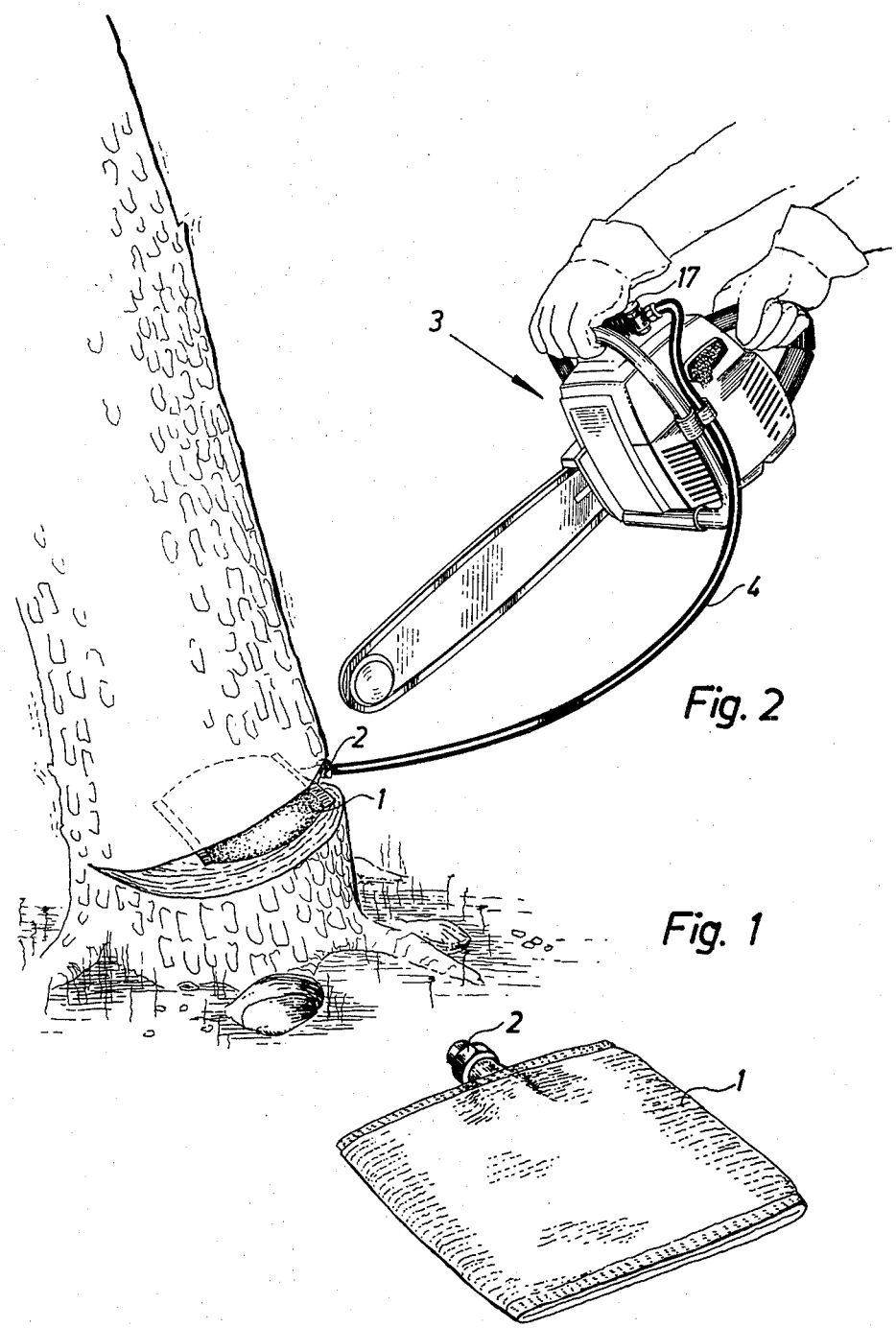
FIG. 1 shows a cushion according to the invention.
FIG. 2 illustrates a preferred method of applying and utilizing the cushion.

The cushion 1 shown in FIG. 1, for example, may comprise an inner gas-tight bag, which is provided with connection means 2 and enclosed in a strong casing, for example of nylon cord. The cushion preferably is manufactured so thin that in its flattened state it is insertible into a normal notch. The thickness should not exceed 6 mm.

FIG. 2 shows a preferred application of the cushion 1 for producing a necessary tipping moment at tree felling. The cushion is inserted into a saw notch in the tree trunk made by the power saw 3. Preferably, a directional notch (not shown) is provided on the opposed side of the tree The cushion in this application acts directly against the cutting surfaces and, therefore, by itself must produce the necessary tipping moment, which often requires a lifting force of several thousand kp. This requires a relatively high pressure in the cushion. According to the invention, the cushion can be inflated to the necessary pressure by drawing compressed gas from the power saw motor cylinder, which will be described in greater detail below with reference to FIG. 6. As the saw motor can be utilized for inflating the cushion, the only step required is to provide a hose 4 between the cushion 1 applied in the sawing notch and the saw motor. When the saw motor is started, the cushion can be inflated to such a pressure that a sufficient tipping force will act on the cutting surfaces in the tree. As already mentioned, due to the hose connection the operator can at this stage be at safe distance from the tree.

Figure 3:
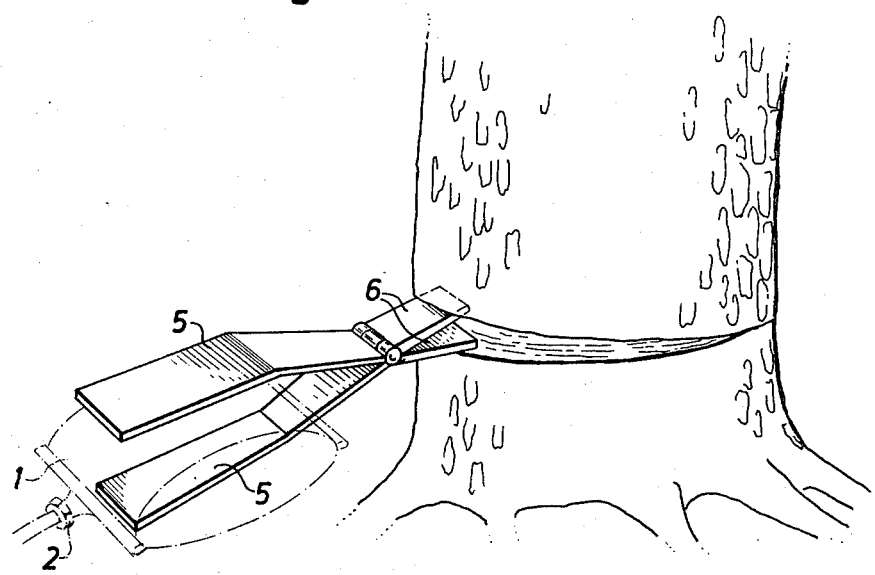
FIGS. 3–5 illustrate in a schematic manner alternative methods of applying the cushion.
Figure 4:
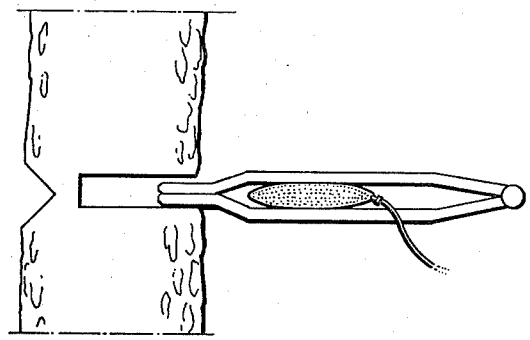
Figure 5:
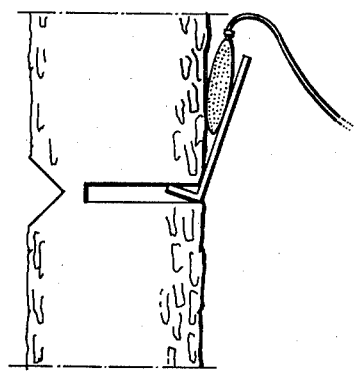

In the embodiments shown in FIGS. 3–5 the cushion itself is not inserted into the saw notch, but the tipping force is transferred to the cutting surfaces via lever means. According to FIG. 3 is a device resembling a pair of tongs is used, and the cushion 1 is positioned between the two long legs 5 while the short legs 6 are inserted into the saw notch. Upon expansion of the cushion during its inflation, the legs 5 will move away from each other and transfer necessary tipping force to the cutting surfaces in the tree trunk.

FIG. 4 shows a variant of the device according to FIG. 3, in which the cushion 1 is arranged ahead of the joint 19 between two elongated legs 20.

The device illustrated in FIG. 5 resembles closely a conventional crowbar, which comprises two fixed legs 21 and 22 forming a given angle with each other. The cushion 1 is placed between the long leg 21 and the tree trunk.

The embodiments shown in FIGS. 3–5 require additional implements, but they offer among other things the advantage of rendering it possible to obtain, due to the lever effect, a desired power ratio, whereby the demand on the cushion pressure possibly can be reduced. These devices, besides, permit the application of larger cushions, because the area of the tree trunk (and cutting surface) is no longer a limiting factor. This also contributes to a lowering of the cushion pressure demand. Compared with the case in which the cushion is inserted directly into the saw notch, also the lifting height can be increased.

Figure 7:
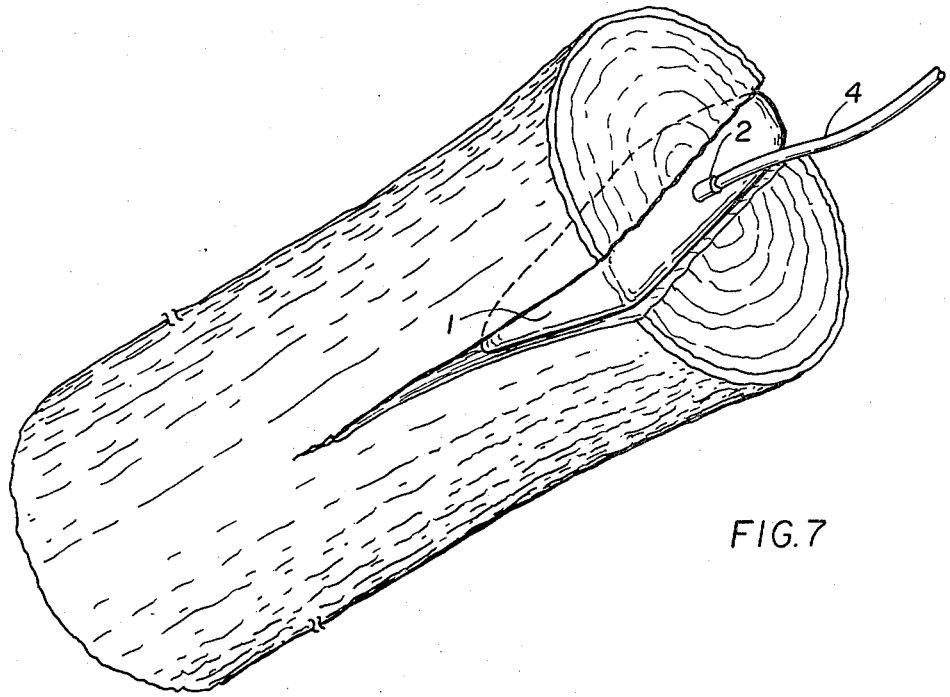
FIG. 7 illustrates the invention used for splitting logs.

The embodiments of FIGS. 1–5 can also be used in wood splitting. An example is shown in FIG. 7 wherein the embodiment of FIG. 1 is illustrated inserted into a notch in a log. Upon inflation of the cushion 1, the log is caused to split along the direction of its grain. This implementation is advantageous to split logs for use as firewood in open fireplaces. It should be clear how the embodiments of FIGS. 2–5 can be similarly used for wood splitting.

Figure 6:
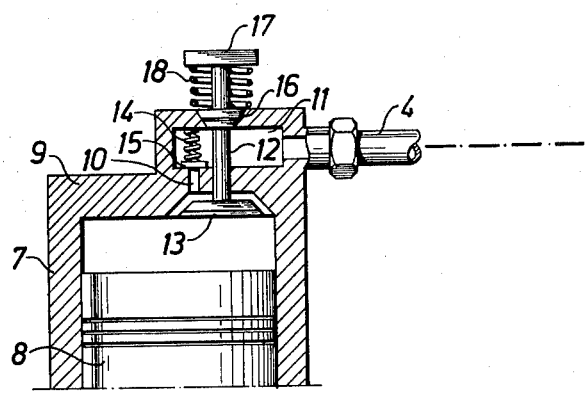
FIG. 6 shows valve means assembled with the power saw motor cylinder.

FIG. 6 shows in a schematic manner how compressed gas can be drawn from the motor cylinder for inflating the cushion 1. The motor cylinder is designated by 7 and the associated piston by 8. In the cylinder head 9 a valve seat is provided, from which a passage 10 extends upward into a chamber 11 prepared for connection with the hose 4 leading to the cushion 1.

A valve disc 13 connected to a valve spindle 12 fits into said valve seat. The passage 10 is closed by means of a check valve 15 loaded by a spring 14. The valve spindle 12 is provided with a further valve disc 16 fitting into a valve seat in the upper wall of the chamber 11. A button 17 is provided for the operation of the valve spindle and can be depressed against the action of a spring 18.

In the position shown the button 17 is held depressed, which corresponds to a completed sawing operation and desired inflation of a cushion connected to the saw motor. The valve being in the position shown, the gas pressure in the cylinder 7 opens the check valve 15 during the compression stroke of the piston 8 after the compression has assumed a value predetermined by the spring bias, and gas is thereby supplied to the cushion 1 via the chamber 11 and hose 4. The cushion, thus, is supplied with a certain amount of compressed gas during each of the working cycles of the motor. These amounts decrease as the pressure in the cushion increases. The gas mass and the pressure thereof supplied to the cushion during each working cycle, thus, depend on the total load on the check valve 15. In order to permit adjustment to varying conditions, the spring 14 can be provided with means for controlling its spring force. The cushion volume and gas pressure are to be chosen so that necessary inflation of the cushion is achieved as rapidly as possible. It has been found possible, for example, without disturbance of the motor function to inflate a cushion with an area of 150 cm$^2$ within about 10 seconds to a pressure of 20 bar providing a maximum force of about 3000 kp. Assuming that the cushion was inflated to the desired pressure and as a result thereof the tree in question has been felled, the operator releases the button 17, and the power saw again is ready for use in a subsequent sawing operation. Upon release of the button 17, the spring 18 presses the valve spindle 12 with the valve discs 13 and 16 upward, and thereby the passage 10 is closed. The cylinder then will operate in conventional manner. The upward movement of the valve disc 16 further implies that the cushion 1 is evacuated via the hose 4, the chamber 11 and the gap formed between the valve disc 16 and the corresponding valve seat. The cushion can thus be flattened entirely and again be inserted into a saw notch as soon as the next sawing operation is completed.

The invention thus shows several advantages, most of which are due to the simple design and low weight of the device for producing the necessary wood breaking forces, tipping moment in tree felling and to the possibility of driving the devices from he saw motor. The device does not comprise movable parts except for the valve mechanism associated with the motor cylinder.

Figure 8:
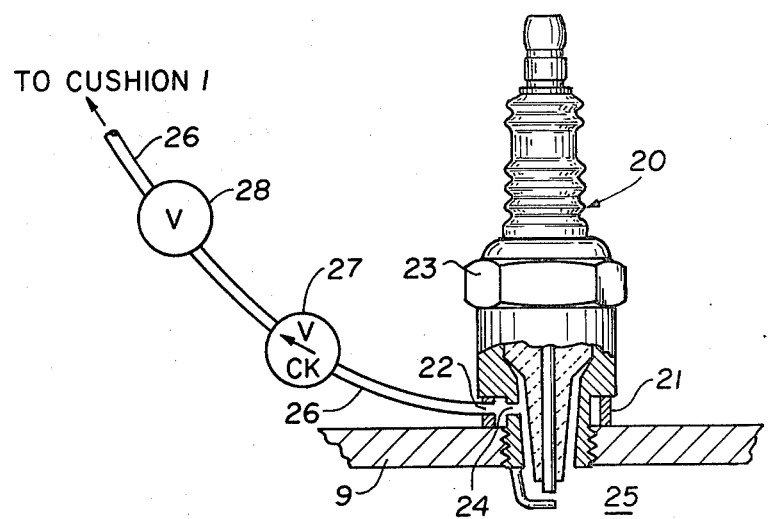
FIG. 8 illustrates a special spark plug for use with the power saw motor cylinder.

FIG. 8 shows in a schematic manner another embodiment for drawing a compressed gas from the motor cylinder for inflating the cushion 1. The cylinder head 9 is only partially shown in FIG. 8, the showing of the remainder of the cylinder, including the piston, being omitted for the sake of simplicity since these parts are conventional.

As shown in FIG. 8, a spark plug 20 is threaded into the cylinder head. A spacer ring 21 having a hole 22 therein is interposed between the flange 23 of the spark plug and the cylinder head 9. The spark plug has a hole 24 through the socket wall thereof which is in alignment with the hole 22 of spacer 21. The holes 22 and 24 are in communication with the interior 25 of the cylinder, as clearly seen from FIG. 8. A conduit 26 is connected to the spacer 21 in communication with the hole 22 for supplying compressed gas to the cushion 1. A check valve 27 is provided in the conduit 26 which operates similarly to check valve 15 of FIG. 6. A further valve 28 is provided in conduit 26 for opening and closing the conduit in order to effect evacuation and flattening of the cushion 1.

The spark plug of FIG. 8 can be modified so that the passageway 24 extends directly into the conduit 26, thereby eliminating the requirement for a spacer ring 21. In this case, the portion of the socket wall with the passageway 24 therein could be enlarged so as to seal against the top of the cylinder head, in a manner similar to the spacer ring 21.

The FIG. 8 embodiment has the advantage that old powers saws can be used for tipping tress or splitting wood in accordance with the present invention merely by replacing the conventional spark plug with one constructed in accordance with FIG. 8.

The above description is based on the assumption of first performing a desired saw notch and thereafter causing a tipping or wood breaking or splitting force to act on the cutting surfaces. It may, however, prove advantageous to permit a tipping or splitting force to act also at least during the final phase of the sawing operation. In practical work, the cushion or associated means can be inserted into the saw notch as soon as the notch is sufficiently large, whereafter the sawing can continue until the tree starts falling, or in the case of wood splitting, until the wood splits apart. The valve in the cylinder (FIG. 6) can be designed so as to remain in a depressed position and may, for example, be adapted to maintain the pressure in the cushion constant at a preset value.

In order to effect rapid evacuation and complete flattening of the cushion 1, the conduits 4 (FIG. 1) and 26 (FIG. 8) can be adapted for connection to a space with underpressure in the motor or to an ejector nozzle provided in the exhaust passage.

In order to provide proper tipping forces for tipping of trees, tests have shown that the pressure in the cushion must amount to at least 300 psi, and preferably about 500 psi. With the present invention, tipping and felling of a tree can be advantageously accomplished even in a forest, by using pressure gas from a power saw motor as the pressure gas source to the inflatable cushion. By using this arrangement, pressures on the order of at least 300 psi, preferably of about 500 psi, are easily obtainable, in order to tip trees, even with heavy snow loads thereon. Applicant has found that a lifting capacity of up to eight tons can be obtained by a cushion which is only 5–6 mm thick (less than one quarter inch). In less than 20 seconds this cushion may be inflated by pressure built up in a chain saw cylinder to produce a lifting force of about 3000–8800 kgf (6600–19360 1bf), depending upon the size of the cushion. The size of the cushion is adaptable to suit the chain saw engine capacity and the type of trees to be felled or the type of wood to be split.

The invention also in its remaining parts can be varied in several respects, in which connection, for example, the form of the cushion can be varied as desired. For sawing of so-called pointed timber for example, the cushion suitably may be given a triangular or parallel-trapezoidal form. The device for drawing gas pressure from the cylinder may also be varied, for example by positioning the check valve in the cylinder head and a three-way valve in the passage between the check valve and the cushion. The embodiment shown in FIG. 6, however, has the advantage, that the high temperature in the cylinder does not act directly on the check valve and the associated spring when gas is not drawn from the cylinder. The spring bias of the check valve of FIG. 6 may be omitted whereby among other things a higher pressure in the cushion can be obtained. A flexible casing for the cushion offers the advantage of good engagement with any uneven cuttings surfaces. The cushion, however, if desired can be provided with a sheet metal lining on the upper and lower surfaces thereof, or only on one of these surfaces. This metal sheet may be grooved or provided with other means for effecting good engagement with the associated cutting surface in the tree trunk. The term cushion in this connection is to be understood to refer to different devices which, independently with respect to form and structure, can be expanded by inflation with a pressure medium, such as compressed gas or pressure oil. The spreadout form of the cushion shown in the drawing provides among other things the advantage that necessary tipping force can be obtained at moderate cushion pressure.

I claim:

1. Apparatus for producing a breaking force against a cutting surface in a notch, or the like, in wood, comprising:
    an inflatable cushion insertable in said notch for applying a breaking force to at least one cutting surface in said wood upon inflation of said cushion;
    conduit means for connecting said cushion to the combustion chamber of a cylinder of an internal combustion engine;
    a spark plug connected to said combustion chamber of the cylinder of said internal combustion engine, said spark plug having a passageway therethrough, said passageway being coupled to said conduit means and communicating said conduit means with said combustion chamber; and
    valve means coupled to said conduit means for controlling the inflation of said cushion by controlling the feed of compressed gas from said combustion chamber to said cushion to sufficiently inflate said cushion to produce said breaking force.

2. Apparatus according to claim 1, comprising a check valve coupled to said conduit means for connection of said cushion to said cylinder via said check valve and said valve means.

3. Apparatus according to claim 2 further comprising valve means coupled to said conduit for releasing the pressure in said conduit to deflate said inflatable cushion.

4. Apparatus according to claim 1, wherein said valve means is a cut-off valve.

5. Apparatus according to claim 1 wherein said apparatus includes said engine, said engine being the engine of a power saw used to make said cutting surface in said wood.

6. Apparatus according to claim 1 further comprising a spacer ring coupled to said spark plug and having an opening therein, said opening being connected to conduit means and being communication with said passageway of said spark plug.

7. Apparatus according to either of claims 1 or 19 wherein said passageway is formed in a side wall of said spark plug.

8. Apparatus according to claim 7 wherein said side wall in which said passageway is formed is a threaded side wall of said spark plug.

9. Apparatus according to claim 1 further comprising lever means operatively cooperable with said inflatable cushion for applying said breaking force produced by said inflatable cushion to said cutting surface.

10. Apparatus according to claim 9 wherein said cutting surface is a surface of a saw notch in wood, and wherein said lever means comprises a first rigid leg portion and a second rigid leg portion rigidly extending at an angle from said first leg portion, one of said leg portions being adapted to be inserted into said notch, said inflatable cushion being interposed between a surface of said wood and the other of said leg members for applying said breaking force to said cutting surface upon inflation of said inflatable cushion.

11. Apparatus according to claim 9 wherein said cutting surface is a surface of a saw notch in wood, and wherein said lever means comprises first and second leg portions pivotally connected together and a portion of said first and second leg portions being adapted to be inserted into said notch in wood, said cushion being interposed between said first and second leg portions for spreading same and applying said breaking force to said cutting surface upon inflation of said inflatable cushion.

* * * * *